(12) United States Patent
Gawlas et al.

(10) Patent No.: US 10,050,790 B2
(45) Date of Patent: Aug. 14, 2018

(54) METHOD FOR AUTHORIZING A TRANSACTION

(71) Applicant: GIESECKE & DEVRIENT GMBH, München (DE)

(72) Inventors: Florian Gawlas, München (DE); Jan Eichholz, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 6 days.

(21) Appl. No.: 15/111,895

(22) PCT Filed: Jan. 19, 2015

(86) PCT No.: PCT/EP2015/000083
§ 371 (c)(1),
(2) Date: Jul. 15, 2016

(87) PCT Pub. No.: WO2015/106971
PCT Pub. Date: Jul. 23, 2015

(65) Prior Publication Data
US 2016/0337126 A1 Nov. 17, 2016

(30) Foreign Application Priority Data
Jan. 17, 2014 (DE) .................. 10 2014 000 644

(51) Int. Cl.
*H04L 9/32* (2006.01)
*G06Q 20/32* (2012.01)
(Continued)

(52) U.S. Cl.
CPC ............ *H04L 9/3226* (2013.01); *G06F 21/41* (2013.01); *G06Q 20/325* (2013.01);
(Continued)

(58) Field of Classification Search
None
See application file for complete search history.

(56) References Cited

U.S. PATENT DOCUMENTS 8,909,933 B2 * 12/2014 Pieczul ................. H04L 9/3215
713/168
9,412,283 B2 * 8/2016 Bhatnagar ................. G09C 5/00
(Continued)

FOREIGN PATENT DOCUMENTS

| EP | 1969880 A1 | 9/2008 |
|---|---|---|
| WO | 2009031140 A2 | 3/2009 |
| WO | 2010140876 A1 | 12/2010 |

OTHER PUBLICATIONS

German Examination Report for corresponding German Application No. 102014000644.1, dated Nov. 24, 2014.
(Continued)

*Primary Examiner* — Peter Poltorak
(74) *Attorney, Agent, or Firm* — Justin J. Cassell; Workman Nydegger

(57) ABSTRACT

A method for authorizing a transaction has the following steps: inputting transaction data on a first mobile device, transmitting the transaction data from the first device to a background system by means of a first over-the-air interface, transmitting in encrypted manner at least a password to a second mobile device through the intermediary of the first mobile device, and authorizing the transaction by inputting the password displayed on the second device on the first device.

7 Claims, 1 Drawing Sheet

(51) Int. Cl.
*G06Q 20/38* (2012.01)
*G06Q 20/40* (2012.01)
*H04L 29/06* (2006.01)
*G06F 21/41* (2013.01)
*H04W 12/04* (2009.01)
*H04W 12/06* (2009.01)

(52) U.S. Cl.
CPC ....... *G06Q 20/327* (2013.01); *G06Q 20/3276* (2013.01); *G06Q 20/385* (2013.01); *G06Q 20/401* (2013.01); *H04L 63/061* (2013.01); *H04L 63/083* (2013.01); *H04L 63/0838* (2013.01); *H04W 12/04* (2013.01); *H04W 12/06* (2013.01); *H04L 63/18* (2013.01); *H04L 2209/56* (2013.01); *H04L 2209/80* (2013.01); *H04L 2463/102* (2013.01)

(56) References Cited

U.S. PATENT DOCUMENTS

| | | | |
|---|---|---|---|
| 2001/0045451 A1* | 11/2001 | Tan | G06F 21/33 235/375 |
| 2001/0047335 A1* | 11/2001 | Arndt | G06Q 20/04 705/44 |
| 2002/0060242 A1* | 5/2002 | Hayashida | G06Q 20/04 235/379 |
| 2002/0066042 A1* | 5/2002 | Matsumoto | G06Q 20/02 726/7 |
| 2002/0101988 A1 | 8/2002 | Jones | |
| 2002/0120583 A1* | 8/2002 | Keresman | C07D 209/88 705/65 |
| 2005/0109841 A1* | 5/2005 | Ryan | G06F 13/385 235/380 |
| 2005/0187882 A1* | 8/2005 | Sovio | G06Q 20/20 705/64 |
| 2006/0107037 A1* | 5/2006 | Lincoln | G06F 21/12 713/155 |
| 2007/0067634 A1* | 3/2007 | Siegler | G06F 21/31 713/171 |
| 2007/0241183 A1* | 10/2007 | Brown | G06K 19/06187 235/380 |
| 2008/0092154 A1* | 4/2008 | Hogyoku | H04N 7/163 725/1 |
| 2008/0307515 A1* | 12/2008 | Drokov | G06Q 20/32 726/7 |
| 2011/0088085 A1* | 4/2011 | Novak | G06F 21/31 726/7 |
| 2011/0185180 A1* | 7/2011 | Gullberg | G06Q 20/02 713/176 |
| 2011/0219427 A1* | 9/2011 | Hito | G06F 21/00 726/3 |
| 2012/0096277 A1* | 4/2012 | Perez Soria | G06Q 20/3274 713/179 |
| 2013/0031357 A1 | 1/2013 | Weiss et al. | |
| 2013/0081127 A1* | 3/2013 | Chen | G06Q 20/341 726/9 |
| 2013/0311768 A1* | 11/2013 | Fosmark | G06Q 20/3223 713/155 |
| 2013/0328801 A1* | 12/2013 | Quigley | G06Q 20/3674 345/173 |
| 2014/0059351 A1* | 2/2014 | Braskich | G06F 21/36 713/171 |
| 2014/0331043 A1* | 11/2014 | Cho | G06F 21/6209 713/165 |
| 2015/0229751 A1* | 8/2015 | Scott | G06F 1/1632 455/414.1 |
| 2015/0317626 A1* | 11/2015 | Ran | G06Q 20/3829 705/76 |
| 2016/0048825 A1* | 2/2016 | Swamy | G06Q 20/322 705/67 |

OTHER PUBLICATIONS

International Search Report for corresponding International PCT Application No. PCT/EP2015/000083, dated Apr. 1, 2015.
Wikipedia, "Smartwatch," URL:http://de.wikipedia.org/w/index.php?title=Smartwatch&oldid=127554052, Downloaded on Feb. 14, 2014.
Wikipedia, "Transaction Number," URL:http://de.wikipedia.org/w/index.php?title=Transaktionsnummer&oldid=125735466, Downloaded on Dec. 24, 2013.

* cited by examiner

METHOD FOR AUTHORIZING A TRANSACTION

TECHNICAL FIELD

The present invention relates to a method for authorizing a transaction, for example a money remittance. In the method according to the invention at least two mobile devices are utilized, such as for example a mobile phone, a tablet PC, data glasses, a wristwatch with display device (smartwatch), etc.

PRIOR ART

From WO 2010/140876 A1 there is known a multi-factor authentication method with which a user can authorize a payment in the Internet after having previously authenticated himself sufficiently. In this method, a second channel is employed for transferring a one-time password to the mobile radio phone of the user for the authorization of a transaction.

This method substantially corresponds to the so-called m-TAN method, in which a user first inputs transaction data into the browser of a web-enabled computer or tablet PC. Subsequently, the user receives a text message (SMS) on his mobile phone, which displays the transaction data to him and also includes a code (one time passport) for authorizing the transaction. The user must input this code on his computer to authorize the transaction.

The disadvantage of this method is that for security reasons it is not permissible that the user initiates the transaction with the mobile phone on which he subsequently receives the text message. This is to prevent an unauthorized person being in possession of the mobile phone from readily executing transactions. For this reason, it is checked before the transmission of the SMS whether the transaction data were inputted into the browser of the mobile phone or into an application of the mobile phone. If so, no text message having the one-time password is sent, but an error message is output or the transaction is aborted.

Further, it is disadvantageous in the known methods, that the user is limited in his mobility regarding the fact that he must always employ a larger device, such as a computer or a tablet PC for inputting the transaction data. However, a user of a web-enabled mobile phone or of a tablet PC wants to be capable of carrying out transactions in a very easy and secure manner.

From the prior art there is also known, in addition to the m-TAN method, the PUSH-TAN method, in which a user executes on his mobile phone an additional application by means of which a password for authorizing a transaction is transmitted to him. Since in this method all the steps are executed on one single device (the mobile phone), it is questionable whether a sufficient security level can be attained.

STATEMENT OF THE INVENTION

The invention is based on the object of providing a method for authorizing a transaction, which solves the known problems of the prior art and further is suitable for simplifying the secure and mobile carrying out of a transaction.

The object is achieved by the subject matter of the main claim 1. Preferred configurations of the method of the invention result from the subclaims.

The invention is based on the basic idea of employing, in addition to a first mobile device, a second mobile device for authorizing a transaction, with the second device being in connection with a background system in such a way that the data to be transmitted to the second device are passed through the first mobile device in an encrypted manner.

Accordingly, the method for authorizing a transaction comprises inputting transaction data on a first mobile device, transmitting the transaction data from the first device to a background system by means of an over-the-air interface, requesting the input of a password on the first device in order to authorize the transaction, transmitting in encrypted manner at least the password to a second mobile device, the data employed for the transmission of the password being transferred between the background system and the second mobile device in encrypted manner through the intermediary of the first mobile device, and authorizing the transaction by inputting the password displayed on the second device on the first device.

A "transaction" for the purposes of the invention is, for example, a money remittance to a recipient. For carrying out the transaction, the input of transaction data is necessary. These comprise, for example, account number, bank code, the name of the recipient, and the amount to be remitted. These data have to be transmitted to a background system, which can be for example a server of a bank, in a secured manner, i.e. encrypted. For this purpose, for example a mobile radio network and/or a WLAN can be employed.

With the method according to the invention it is advantageously possible to perform transactions utilizing a second mobile device. The second mobile device does not have to be connected directly with the background system, rather it is sufficient when a connection with the background system is effected through the intermediary of the first mobile device. As the transmission of at least the password from the background system to the second mobile device is effected in encrypted manner, the first mobile device has no use for the data, although the data pass through it, because the data are encrypted. Accordingly, also any malware (Trojan) which may be installed on the first mobile device has no use for the password data transmitted in encrypted manner, because this malware has no knowledge of the necessary key. This ensures that the password can only be read by the second mobile device. Further, the method according to the invention ensures that the password to be transmitted will not be transferred to the device on which the transaction data were inputted.

According to the invention, the first mobile device can be a mobile phone and/or a tablet PC. These devices normally have an Internet browser or an application of a financial institution with which it is possible to input transaction data. Further, they have a suitable over-the-air interface with which it is possible to "pass through" the encrypted password from the background system to the second mobile device.

The second mobile device can be data glasses, a watch with display device (smartwatch) and/or a body-wearable display device, such as for example a ring with display, a wristband with display, a necklace with display, a display at least partly implantable into the skin of the wearer etc. This can advantageously ensure that the user always has the second device with him. In particular glasses and smartwatches become more and more popular, so that it can be expected that users will increasingly wear and apply these devices. The second mobile devices set up a direct connection to the first device via a second over-the-air interface.

According to an embodiment, the second over-the-air interface may be designed as a Bluetooth, infrared, NFC (according to ISO 14443) and/or WLAN over-the-air interface. In this way, a direct and secure communication between the second device and the first device via the over-the-air interface is possible.

According to an embodiment, the second device and the background system exchange a cryptographic key, in particular a symmetric or asymmetric key, before the step of the encrypted transmission. The key is not known to the first device. In this way it can be ensured, that a secure data exchange between the second device and the background system is possible, although the data are passed via the first and the second over-the-air interface and through the first mobile device. This substantially increases the security upon the carrying out of the transaction.

Alternatively, the second device and the background system may set up a secure end-to-end encrypted channel, the first device having no knowledge of the key required for the encryption/decryption of the channel. For setting up the encrypted channel there may be employed a suitable protocol, such as for example PACE (Password Authenticated Connection Establishment).

According to a further particularly preferred embodiment, at least a part of the inputted transaction data may be transmitted together with the password to the second mobile device.

In this way, the user of the method of the invention can quickly check, whether the password really matches an inputted transaction. For example, in addition to the password, account number, name of the recipient and amount could be transmitted to the second mobile device and be displayed there. In this way, the security in the method of the invention is substantially increased.

According to the invention, the password may be a one-time password. Alternatively, the password may be a number which requests the user to select from a list the transaction number associated with this number (iTAN method). According to a further alternative, the password may be a code readable by means of a camera of the first mobile device, in particular a bar code, a 2D bar code and/or a QR code.

Further, the invention is used, when a first mobile device, in particular a mobile phone or a tablet PC, is employed in a method according to any of the preceding claims for authorizing a transaction.

Further, the method according to the invention is used, when a second mobile device, in particular data glasses, a smartwatch and/or a body-wearable display device is employed for authorizing a transaction.

BRIEF DESCRIPTION OF THE DRAWING

Hereinafter the invention will be explained in more detail with reference to embodiments represented in the drawings by way of example. There are shown.

DETAILED DESCRIPTION OF PREFERRED EMBODIMENTS OF THE INVENTION

Hereinafter the invention will be described with reference to the FIGS. 1 and 2 with the help of purely exemplary embodiments.

Figure 1:
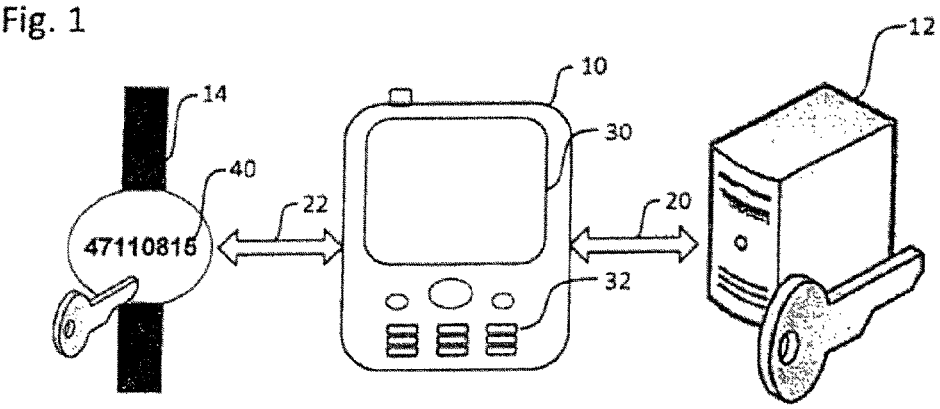
FIG. 1 a schematic representation of the components utilized in a method according to the invention, and FIG. 2 a flowchart representing the sequence of a method according to the invention.
Figure 2:
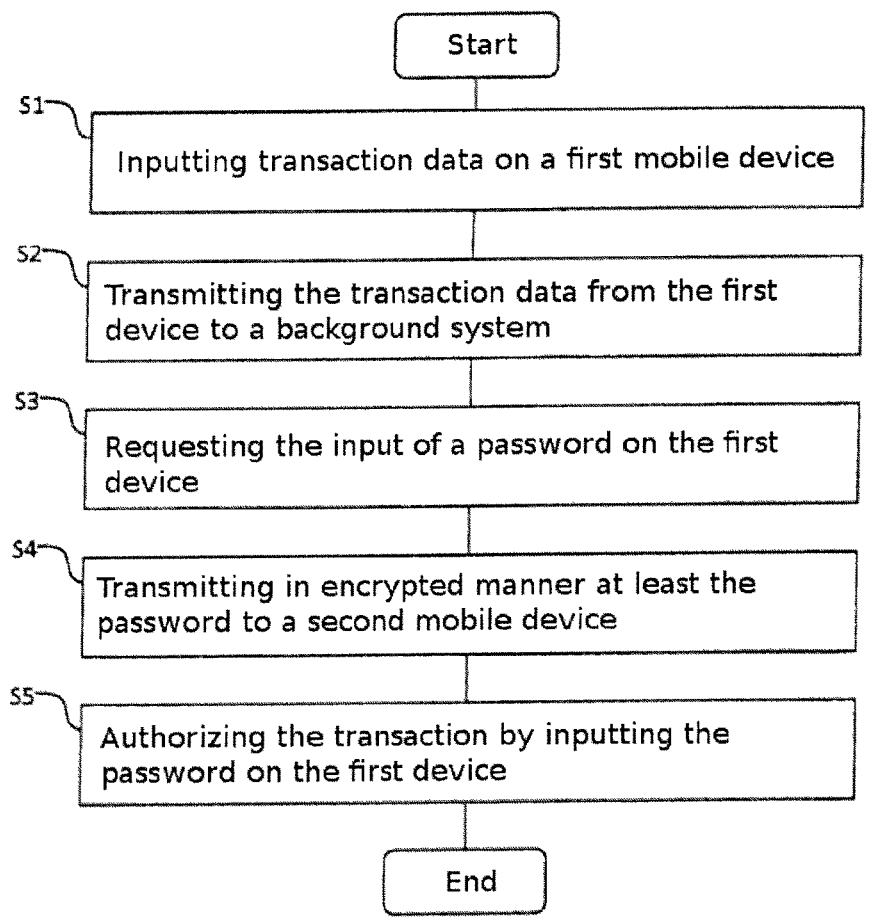

In FIG. 1 a first mobile device 10 is shown in the form of a mobile phone. The first mobile device 10 is provided with a display device 30 and keypad 32, and instead of the keypad 32 there can also be provided a touch-sensitive display device 30, so that the input can be effected directly on the display device 30.

The first mobile device 10 is in connection with a background system 12 via a first over-the-air interface 20. The background system 12 may be, for example, a bank server which is responsible for carrying out and handling remittances. The first over-the-air interface 28 can transmit data between the first device 10 and the background system 12, for example, via the mobile radio network or by WLAN.

The transmission of data between the first device 10 and the background system 12 via the first over-the-air interface 20 can be effected in encrypted manner.

Further, the first mobile device 10 is connected with a second mobile device 14 via the second over-the-air interface 22. The second mobile device 14 has at least one display device, on which, for example, a password 40 can be represented. The second mobile device 10 is preferably configured as data glasses, as a watch with display device (smartwatch) and/or as a body-wearable display device. A body-wearable display device may be, for example, a display device implantable at least partly under the skin, which display device is configured such that a wearer can read it.

The second over-the-air interface 22 may be designed as a Bluetooth, as an infrared and/or as a WLAN over-the-air interface. It establishes a direct connection between the first mobile device 10 and the second mobile device 14.

A user who wants to perform a transaction, such as for example a remittance of an amount of money, opens for this purpose the respective application or the respective website in the browser on the first mobile device 10. Then he inputs data necessary for the transaction on the display device 30 or the keypad 32 and transmits these transaction data from the first mobile device 10 to the background system 12 by means of the first over-the-air interface 20. The transmission of the transaction data may be effected in encrypted manner.

Then the user is requested by the display device 30 of the first mobile device 10 to input a password 40 so as to authorize the transaction.

The password is transferred in encrypted manner from the background system 12 via the first over-the-air interface 20 through the first mobile device 10 and via the second over-the-air interface 22 to the second mobile device 14. Upon transmission, the password data are so encrypted that the first mobile device 10 only "passes" the data "through". In the absence of the corresponding key, the first mobile device 10 cannot read the password data. If a malware (Trojan) is installed on the first mobile device 10, this will have no use for the data relating to the password 40, because it is not in possession of the key necessary for the decryption.

The user can read this password 40 transmitted to the second mobile device 14 on the display device of the second mobile device 14. According to an alternative, not only the password 40 is transmitted, but further data relating to the transaction, such as for example amount, account number and name of the recipient. The user then inputs the password 40, which is displayed on the display device of the second mobile device 14, on the first mobile device 10 in order to thereby authorize the transaction.

For the key exchange between the second mobile device 14 and the background system 12 there can be employed known key exchange methods. For example, an asymmetric key pair can be generated, the second mobile device 14 transferring a public key to the background system 12. Alternatively, a secure channel can be generated between the second mobile device 14 and the background system 12 using a common "secret" and a suitable protocol, such as for example the PACE protocol.

As the key is exchanged only between the second mobile device 14 and the background system 12, a malware (Trojan) present on the first mobile device 10 has no possibility of intercepting the password 40 and of employing it for an abusive remittance/transaction. By the password being represented on the second mobile device 14 which the user always has with him, the method is very user-friendly and still offers high security.

In the method according to the invention, in a first step S1, transaction data are inputted into the first mobile device 10. In the second step S2, the transaction data are transmitted from the first device to a background system 12. The transmission can be effected via the first over-the-air interface 20. Subsequently, the first device 10 requests the user to input a password confirming the transaction on the first device 10 (step S3).

In the fourth step S4, this password is transmitted in encrypted manner from the background system 12 to the second mobile device 14. The transmission is effected via the first 20 and the second 22 over-the-air interface, the encrypted password data being passed through the first mobile device 10 when transmitted. The first mobile device 10 has no knowledge of the decryption information and has therefore no use for the password data.

The authorization of the transaction is effected by inputting the password 40 on the first device 10 (step S5). For this purpose, the user adopts the password 40 from the display device of the second device 14 and inputs it into the first device 10. Alternatively, the user can read the password 40 with a camera of the first mobile device 10. In this case, it is advantageous when the password 40 is additionally represented as a 2D bar code, in particular a QR code.

LIST OF REFERENCE NUMBERS 10 first mobile device
12 background system
14 second mobile device
20 first over-the-air interface
22 second over-the-air interface
30 display device
32 keypad
40 password

The invention claimed is:

1. A method for authorizing a transaction, having the following steps:
   inputting transaction data on a first mobile device;
   transmitting the transaction data from the first device to a background system by means of a first over-the-air interface;
   requesting the input of a password on the first device in order to authorize the transaction;
   transmitting in encrypted manner at least the password from the background system to a second mobile device, wherein the data employed for the transmission of the password are transferred between the background system and the second mobile device in encrypted manner through the intermediary of the first mobile device, and authorizing the transaction by inputting the password displayed on the second device on the first device;
   wherein the second mobile device is not connected directly with the background system, and the second mobile device receives a cryptographic key through the intermediary of the first device; and
   wherein the second device and the background system exchange the cryptographic key, of which the first device has no knowledge, before the step of the encrypted transmission.

2. The method according to claim 1, wherein the first mobile device is a mobile phone and/or a tablet PC.

3. The method according to claim 1, wherein the second mobile device is a second device being in connection with the first mobile device via a second over-the-air interface.

4. The method according claim 1, wherein the second device is data glasses, a smartwatch and/or a body-wearable display device.

5. The method according to claim 1, wherein the second device and the background system set up a secure end-to-end-encrypted channel, wherein the first device has no knowledge of the key required for the encryption of the channel.

6. The method according to claim 1, wherein together with the password at least a part of the inputted transaction data are transmitted to the second mobile device.

7. The method according to claim 1, wherein the password is a one-time password.

* * * * *